United States Patent
Mellachervu et al.

(10) Patent No.: US 7,720,009 B2
(45) Date of Patent: May 18, 2010

(54) VIRTUAL PRIVATE NETWORK (VPN) TOPOLOGY IDENTIFIER

(75) Inventors: Koteswar Rao Mellachervu, Fremont, CA (US); Grace Lu, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 117 days.

(21) Appl. No.: 12/170,074

(22) Filed: Jul. 9, 2008

(65) Prior Publication Data

US 2010/0008253 A1     Jan. 14, 2010

(51) Int. Cl.
  H04L 12/28     (2006.01)
  H04L 12/26     (2006.01)
  H04L 12/46     (2006.01)
  H04L 12/56     (2006.01)
  G06F 15/177    (2006.01)

(52) U.S. Cl. .................. 370/255; 370/395.53; 370/400; 709/220; 709/224; 709/242

(58) Field of Classification Search .................. 370/254, 370/255, 351, 352, 389, 395.53, 400, 401, 370/411; 709/220, 221, 238, 242, 223, 224
See application file for complete search history.

(56) References Cited

U.S. PATENT DOCUMENTS

| 6,512,768 B1 | 1/2003 | Thomas |
| 2007/0280241 A1 | 12/2007 | Verma |

OTHER PUBLICATIONS

Clouston, B. et al., "Definitions of Managed Objects for Extended Border Node", The Internet Society, Network Working Group, Standards Track, (Nov. 1998), pp. 1-28.

*Primary Examiner*—Chi H Pham
*Assistant Examiner*—Ahmed Elallam (57) ABSTRACT

Various embodiments are disclosed relating to the identification of virtual private network (VPN) topologies. In an example embodiment, a plurality of edge routers associated with a network may be discovered, each edge router including one or more virtual routing and forwarding entities (VRFs). One or more route targets (RTs) associated with each of the VRFs may be determined, wherein corresponding RTs between two or more VRFs are associated with connectivity between the two or more VRFs via the network. The VRFs may be sorted into one or more groups based upon the corresponding RTs of the VRFs. A representative VRF (rVRF) may be identified for each of the one or more groups of VRFs. The rVRFs may be sorted into one or more VPNs and a topology for each VPN may be determined.

18 Claims, 6 Drawing Sheets

VIRTUAL PRIVATE NETWORK (VPN) TOPOLOGY IDENTIFIER

TECHNICAL FIELD

This description relates to the identification of virtual private network (VPN) topologies.

BACKGROUND

Networks provide communication pathways between devices that are spatially located apart from each other and have become an important part of maintaining communication between network devices. The networks may include one or more sub-networks that provide and/or restrict communication between two or more devices connected to the networks. An example sub-network may include a virtual private network (VPN) that may be used to allow or enable communication via a larger network between two or more devices and/or restrict other devices (outside the VPN) from gaining communication privileges associated with the VPN. Thus a single network may include multiple VPNs.

DESCRIPTION OF EXAMPLE EMBODIMENTS

Overview

According to an example embodiment, a method of determining a topology associated with each of one or more virtual private networks (VPNs) of a network. A plurality of edge routers associated with the network may be discovered, each edge router including one or more virtual routing and forwarding entities (VRFs). One or more route targets (RTs) associated with each of the VRFs may be determined, wherein corresponding RTs between two or more VRFs are associated with connectivity between the two or more VRFs via the network. The VRFs may be sorted into one or more groups based upon the corresponding RTs of the VRFs. A representative VRF (rVRF) may be identified for each of the one or more groups of VRFs. The rVRFs may be sorted into one or more VPNs based on at least one of: one or more RTs indicating a direct connection between two or more rVRFs, or one or more RTs indicating an indirect connection between two or more rVRFs via a connecting VRF. The topology associated with each of the VPNs may be determined based on the RTs associated with the rVRFs of each VPN of the network.

According to another example embodiment, a method of monitoring one or more virtual private networks (VPNs), each VPN including one or more virtual routing and forwarding entities (VRFs) is provided. One or more route targets (RTs) associated with each of the VRFs may be determined, the RTs including import RTs and export RTs. A representative VRF (rVRF) for each of one or more groups of the VRFs may be identified, wherein each group includes one or more of the VRFs with identical import RTs and export RTs. Which of the VRFs are associated with which of the VPNs may be determined based on: performing, for two or more rVRFs, a first sorting of the rVRFs based on a correspondence between the import RT of at least a first rVRF and the export RT of at least a second rVRF, and performing, for two or more rVRFs, a second sorting of the rVRFs based on a common rVRF, wherein the two or more rVRFs each communicate with the common VRF as determined based on one or more of the import RTs and export RTs for the two or more rVRFs. A topology of each of the VPNs may be determined based on the first sorting and the second sorting. The VPNs may be monitored based on the topology.

According to another example embodiment, a system is provided. A discovery engine may determine import route targets (RTs) and export RTs for each of a plurality of virtual routing and forwarding entities (VRFs) connected to a network, wherein the import RTs and export RTs are associated with connectivity among the VRFs. A representative identifier may identify a plurality of representative VRFs (rVRFs) among the VRFs, wherein a rVRF represents a group of VRFs with identical import and export RTs. A network identifier may group the rVRFs into one or more virtual private networks (VPNs) based on one or more RTs for the plurality of the rVRFs, wherein each VPN includes rVRFs directly or indirectly connected to one another as determined based upon a comparison of the import RTs and export RTs. A topology identifier may determine a topology of each of the one or more VPNs based upon the connectivity of the rVRFs within each VPN, wherein the topology includes one of a full mesh, hub and spoke or partial mesh topology. An event handler may update the topology of one or more of the VPNs based upon an event.

Example Embodiments

Figure 1:
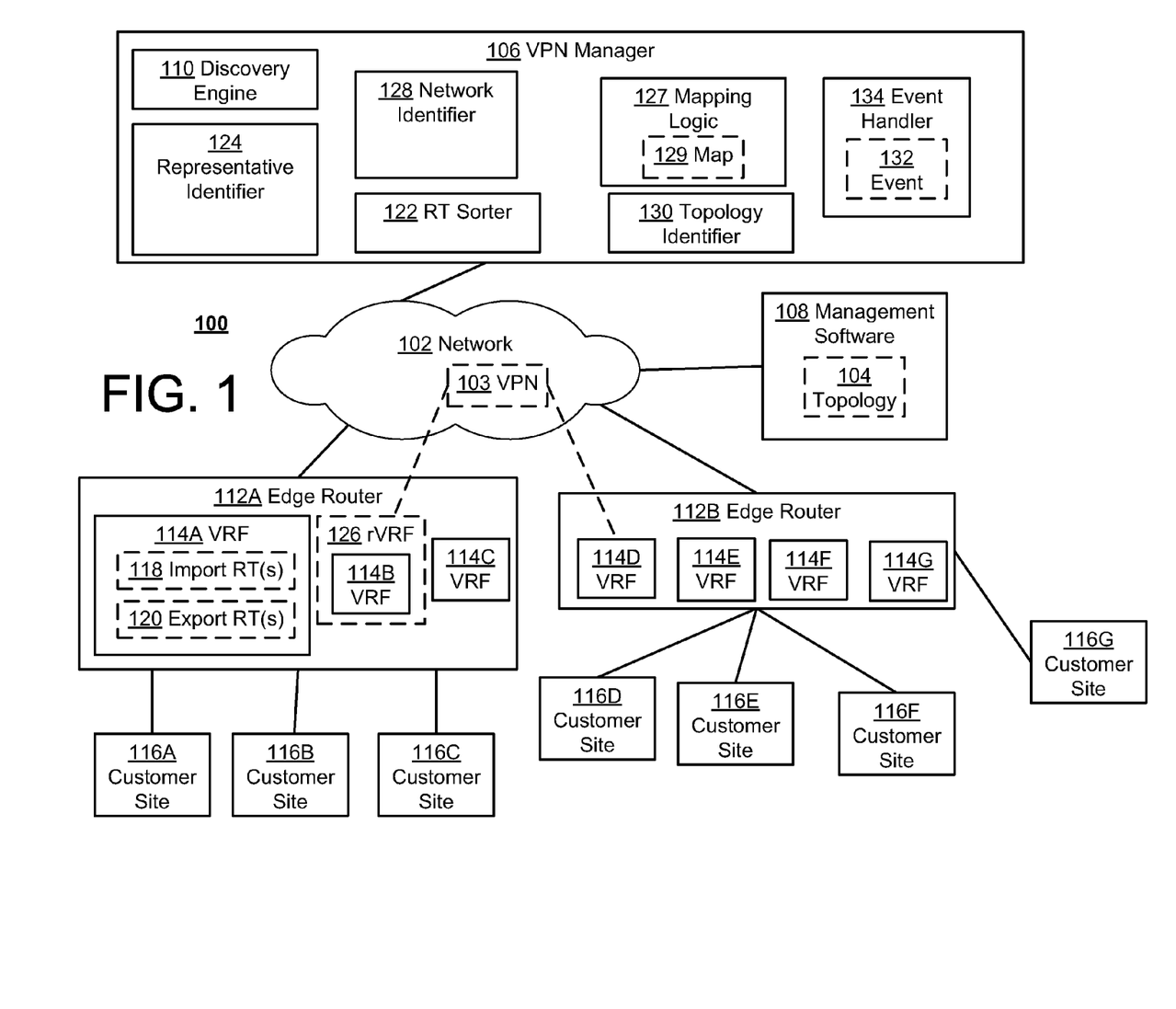
FIG. 1 is a block diagram of an example system for the identifying connectivity among a plurality of sites of a network according to an example embodiment.

FIG. 1 is a block diagram of an example system for identifying the connectivity among a plurality of sites of a network according to an example embodiment. One or more computing devices or nodes may be provided at each of a plurality of customer sites 116, such as at each of customer sites 116A, 116B, 116C, 116D, 116E, 116F and 116G. The term "customer site" or "site" may include one or more computing devices or nodes that may be provided at such site(s). One or more edge routers 112 may be coupled to a network 102 and to one or more of the customer sites 116A-G One or more VPNs (e.g., VPN 103) may be provided between edge routers 112A, 112B, etc., to provide or enable for secure or private communications between two or more customer sites 116A-G via a public or non-secure network 102, as an example.

Network 102 may include any type of network, such as a computer network or communications network and may provide connectivity between network 102 and one or more customer sites, for example. Network 102 may include, for example, an Internet Protocol (IP) backbone or network cloud of a communications or computer network used to provide communications between two or more network devices. Network 102 may provide a communications pathway between two or more customer sites 116A-Q e.g., via one or more routers 112, according to an example embodiment.

A VPN manager 106 may perform tasks related to management of one or more VPNs associated with network 102. VPN manager 106 may include, for example, a discovery engine 110, a representative identifier 124, a RT (route target) sorter 122, a network identifier 128, mapping logic 127, a topology identifier 130, and an event handler 134. Each of these blocks are described in greater detail below. VPN manager 106 may determine a topology for one or more Virtual Private Networks (VPNs) based upon a connectivity among sites or network devices according to an example embodiment. VPN manager 106 may, for example, identify which sites are connected to network 102 and the connectivity among the sites, e.g., which sites may communicate with each other via network 102. Based on the connectivity of the sites, system 100 may determine one or more VPNs 103 that may exist on network 102, including the connectivity among the sites of each VPN 103, and classify the VPNs 103 into topologies 104. According to an example embodiment, representative information may be used to improve the computational efficiency for determining topologies for VPNs associated with network 102.

A management software (or management block) 108 and/or VPN manager 106 may update any existing or otherwise previously determined topologies 104 and/or VPNs 103 based on a change in the connectivity of one or more of the sites. System 100 will now be described in greater detail.

Customer sites 116A-G may include a grouping of one or more devices or nodes connected to network 102. For example, customer sites 116A-G may be associated with one or more customers, wherein each customer site 116A-G may include anything from a single device or other node connected to network 102 to a campus of buildings with hundreds or even thousands of devices connected to network 102. Then for example, network 102 may allow, through the establishment or designation of VPNs 103, secured (or unsecured) communication between two or more of customer sites 116A-G For example, network 102 may allow customer sites 116B and 116D communicate with one another over network 102 via VPN 103.

VPN 103 may include a sub-network of network 102. VPN 103 may provide communications between two or more customer sites 116A-G connected to network 102, wherein each customer site 116A-G of VPN 103 has direct and/or indirect connectivity with at least one other customer site 116A-G belonging to the same VPN (e.g., VPN 103). An example VPN 103 may include a corporate intranet connecting devices across one or more regions via network 102, or a sub-network as provided by a single service provider. By way of example, in the example of FIG. 1, VPN 103 is shown as providing connectivity among customer sites 116B and 116D, wherein VPN 103 may allow direct communication between the connected sites via network 102. Then for example, customer sites 116A, C, and E-G outside VPN 103 may be prevented from communications with customer sites 116B and D inside VPN 103 without first gaining access to VPN 103.

Topology 104 may include a network topology associated with each of one or more VPNs 103 of network 102, wherein network 102 may include one or more VPNs 103 of varying topologies 104. Topology 104 may include an arrangement, mapping or other connectivity pattern of VPN 103. Based on topology 104, it may be determined which customer sites 116A-G of network 102 may communicate either directly or indirectly with each other, including the direction of communication. For example, topology 104 may indicate whether customer site 116B may receive and/or transmit information from/to customer site 116D belonging to the same VPN 103.

According to an example embodiment, topology 104 may include one of a full mesh topology, hub and spoke topology (e.g., central services) or partial mesh topology. A full mesh topology may include an arrangement whereby each site (e.g., customer site 116A-G) of VPN 103 may directly communicate with every other site of VPN 103. A hub and spoke topology may include an arrangement whereby VPN 103 may include a set of hub sites each of which may directly communicate with every other hub site of VPN 103 and a set of spoke sites each of which may directly communicate with one or more of the sites nodes of VPN 103 and indirectly with each other. A partial mesh topology may include any arrangement that is neither a full mesh topology nor a hub and spoke topology.

As additional customer sites (e.g., 116A-G) are added to network 102 and connectivity among the existing and/or additional customer sites is modified, determining the VPNs 103 of network 102 and the connectivity among the sites of each VPN may become a cumbersome task in traditional systems. For example, in determining a full-mesh topology, as discussed above, each site of a VPN may be enabled to communicate with every other site of the VPN, thus if network 102 includes X sites there may be up to $X^2$ connectivity combinations. As X grows, the number of connectivity combinations may grow even faster, thus requiring very significant resources and/or time to compute topologies among VPNs of network 102. Then for example, if connectivity on any site changes, there will be at least X connectivity combinations to sort through to update the topologies of network 102 in traditional systems.

VPN manager 106 may provide an advantage over traditional systems in computing connectivity among two or more customer sites 116A-G of network 102. Rather than compute $X^2$ (or $X^2$) connectivity combinations for a network 102 with X customer sites 116A-G, VPN manager 106 may group customer sites 116A-G based on identical connectivity among them, identify a representative for each group and then determine VPNs 103 and topologies 104 based on connectivity among the representatives. This may allow a network or VPN topology to be determined, while using significantly less computing resources, based on the use of representatives for each group. These representatives may, for example, be referred to as representative VRFs or rVRFs, and are described in greater detail below.

For example, if network 102 included 100 customer sites 116A-G, traditional systems may compute 10,000 (e.g., 100^100) connectivity combinations. VPN manager 106, however, may determine that of the 100 customer sites, there are 50 with identical connectivity, thus at most VPN manager 106 may have to compute 2,500 connectivity combinations (e.g., 50^50). If however, any of the topologies are full-mesh or hub and spoke, based on formulas (as will be discussed in more detail below), VPN manager 106 may be able to determine topologies 104 for VPNs 103 with performing even fewer calculations. Similar reductions in computations may be applied when connectivity among the customer sites 116A-G is modified or otherwise changes.

Discovery engine 110 may discover customer sites 116A-G connected to network 102. For example, edge routers 112A and 112B may connect customer sites 116A-G to network 102. Then for example, edge routers 112A and 112B may include virtual routing and forwarding entities (VRFs)

114A-G that correspond to customer sites 116A-G and identify connectivity among customer sites 116A-G via network 102. Discovery engine 110 may discover VRFs 114A-G as corresponding to and connecting customer sites 116A-G to network 102 via edge routers 112A and 112B.

Edge routers 112A, B may receive and forward communications among customer sites 116A-G of network 102. Edge routers 112A, B may include, for example, network routers that communicate with one another via the wired and/or wireless connections of network 102 and/or otherwise enable communication between two or more of customer sites 116A-G via network 102. Customer sites 116A-G may connect to or otherwise communicate with edge routers 112A, B by way of one or more attachment circuits.

As referenced above, edge routers 112A, B may include or otherwise be sub-divided into one or more logical partitions or virtual routing and forwarding entities (VRFs) 114A-G VRFs 114A-G may correspond to one or more customer sites 116A-G connected to each edge router 112A, B and may include routing information indicating connectivity among the customer sites 116A-G of network 102. For example, VRFs 114A-G may include one or more routing tables used by edge routers 112A, B to determine with which customer sites 116A-G may communicate with one another. Or for example, VRFs 114A-G may indicate with which other VRFs 114A-G of network 102 each VRF 114A-G, including customer sites 116A-G connected to VRFs 114A-Q may communicate. According to an example embodiment, VRFs 114A-G may include one or more tables that indicate which customer site(s) 116A-G connected to a VRF 114A-G may transmit information to and/or receive information from other VRFs 114A-G.

VRFs 114A-G may provide a communications schema between customer sites 116A-F based on import route targets (import RTs) 118 and/or export route targets (export RTs) 120. Import RTs 118 and export RTs 120 (hereinafter collectively referred to as "RTs") may correspond to addresses and/or other identifiers indicating which VRFs 114A-G (including which corresponding customer sites 116A-G) of network 102 may communicate with each other and the direction of communication.

For example, VRF 114A may correspond to customer site 116A, wherein import RT 118 may include an identifier associated with VRF 114F (corresponding to customer site 116F). Then for example, import RT 118 may indicate that customer site 116A may receive/import information from customer site 116F. If for example, export RT 120 also included a VRF 114F identifier, then customer site 116A may import and export information from/to customer site 116C. Often times, an import RT 118 from a first VRF will correspond to an export RT 120 from a second VRF. In continuing the example above, if VRF 114A includes import RT 118 identifying VRF 114F, then VRF 114F may include export RT 118 identifying VRF 114A.

Discovery engine 110 may determine import RT(s) 118 and export RT(s) 120 of VRFs 114A-G For example, discovery engine 110 may determine which VRFs 114A-G are associated with edge routers 112A-B. Then for example, discovery engine 110 may determine import RT(s) 118 and export RT(s) 120 associated with VRFs 114A-G.

Route target sorter 122 (RT sorter) may sort VRFs 114A-G into one or more groups based on matching or identical import RT(s) 118 and export RT(s) 120 among VRFs 114A-G For example, RT sorter 122 may group a first VRF 114A and a second VRF 114C into the same group if the RTs of the first VRF 114A match the RTs of the second VRF 114C. Each group may contain any number of VRFs 114A-G that have identical RTs; in an example embodiment it may be that one or more groups contain only a single VRF 114A-G. According to an example embodiment, RT sorter 122 may group one or more VRFs 114A-G into a group if they share not only identical RTs, but also, behave similarly with respect to connectivity within network 102.

Representative identifier 124 may identify a representative VRF 126 (rVRF) from each group. As referenced above, each group may include one or more VRFs 114A-G with similar RTs and connectivity properties within network 102. Then for example, one of the VRFs 114A-G may be selected or identified within each group as rVRF 126 by representative identifier 124. RVRF 126 may include any VRF 114A-G from a group, and may be used to represent the connectivity of each VRF 114A-G within the associated group.

Identifying a rVRF for each group (such as rVRF 126) may allow for expedited processing of network 102 to determine VPNs 103 and topologies 104, by resulting in fewer connectivity combinations which to parse. For example, rather than determining VLAN 103 and topology 104 for all VRFs 114A-G of network 102, VLAN manager 106 may determine VLAN 103 and topology 104 using only the rVRFs 126 as identified by representative identifier 124. By way of example, representative identifier 124 has determined VRF 114B as being rVRF 126 for the group of VRFs including VRF 114B and VRF 114D, wherein both VRFs 114B and 114D have identical import RTs 118 and export RTs 120.

Mapping logic 127 may construct, generate or otherwise define one or more maps 129. Mapping logic 127 may generate maps 129 from rVRFs 126. According to an example embodiment, map 129 may include one or more of an import map, export map and/or adjacency map. Map 129 may include a table or other mapping of communications between customer sites 116A-G of network 102 based on the RTs (e.g., import RTs 118 and export RTs 120). An import map may include a list of import RT(s) 118 and corresponding VRFs 114A-G that may communicate with the import RT(s) 118. An export map may include a list of export RT(s) 120 and corresponding VRFs 114A-G that may communicate with the export RT(s) 120. An adjacency map (e.g., 129) may include a first list of VRFs 114A-G and any corresponding VRFs 114A-G that communicate with VRFs 114A-G of the first list. Mapping logic 127 may, for example, determine the adjacency map based on the import map and export map. According to an example embodiment, mapping logic 127 may generate the import, export and/or adjacency maps 129 based on a set of rVRFs 126, rather than VRFs 114A-G.

A network identifier 128 may sort or otherwise group VRFs 114A-G into one or more VPNs 103 based on map 129. For example, based on adjacency map 129, network identifier 128 may determine which rVRFs 126 (and consequently which VRFs 114A-G) communicate with each other. Then for example, based on the communication between rVRFs 126, network identifier 128 may arrange one or more groups (e.g., VPN 103) of rVRFs 126 based on which rVRFs 126 communicate with each other. VPN 103 may include a group of one or more rVRFs 126 each of which being configured for direct and/or indirect communication with at least one other member of VPN 103. For example, VRF 114B and VRF 114D may be grouped into VPN 103.

According to an example embodiment, network identifier 128 may determine a direct connection between a first rVRF 126 and a second rVRF 126 if they include corresponding import and/or export RTs (e.g., 118, 120). For example, the import RT 118 of the first rVRF 126 may correspond to the export RT 120 of the second rVRF 126, indicating direct communication.

Network identifier 126 may determine an indirect connection between the first rVRF 126 and the second rVRF 126 if they each have at least one RT (e.g., 118, 120) that corresponds with a third, connecting rVRF 126. For example, the first rVRF 126 may communicate with the third rVRF 126, and the second rVRF 126 may communicate with the third rVRF 126, then the first, second and third rVRFs 126 may be grouped into the same VPN 103 by network identifier 128. In this example, the first and third rVRFs 126 and the second and third rVRFs 126 may share direct communication with the first and second rVRFs 126 may share indirect communication (via the third rVRF 126).

A topology identifier 130 may identify topology 104 for VPN(s) 103. As referenced above, topology identifier 130 may determine whether topology 104 is a full mesh, hub and spoke or partial mesh topology based on the connectivity of the rVRFs 126 belonging to VPN 103. For example, if each rVRF 126 in a VPN 103 communicates with every other rVRF 126 in the same VPN 103, then topology identifier 130 may determine a full mesh topology 104 for VRFs 114A-G of the VPN 103. Or for example, if there are a set of hub rVRFs 126 and spoke rVRFs 126, then topology identifier 130 may determine a partial mesh topology 104. Otherwise, if topology identifier 130 determines neither a full mesh nor hub and spoke topology 104, then topology identifier 130 may determine a partial mesh topology 104 for VPN 103.

Topology 104 may be passed on to or otherwise received by management software 108. Management software 108 may provision (e.g., modify/add/remove) one or more VRFs 114A-G of network 102. For example, management software 108 may receive a request or command to change one or more of the RTs (e.g, 118 and/or 120) of one or more VRFs 114A-G. Then for example, the modification to the RTs may then change or modify topology 104 of one or more of VPNs 103, generating an event 132.

Management software 108 may include a software program, application, network device or other node connected to network 102 and configured to manage network 102 based on topologies 104. For example, management software 108 may monitor VPNs 103 of network 102 based on topology 104 (which may provide the connectivity among VRFs 114A-G and corresponding customer sites 116A-F), and may determine when an error occurs or alarm goes off within network 102 including which VPNs 103 and/or nodes may be affected. Management software 108 may then, for example, notify or alert a network administrator as to the error/alarm and identify the impacted VPN(s) 103 and/or nodes.

According to an example embodiment, management software 108 may maintain a list or other information regarding edge routers 112A, 112B. Then for example, discovery engine 110 may request from management software 108 the information regarding whatever edge routers 112A, B exist on network 102. The information may include, for example, address, location and/or accessibility information of edge routers 112A, B on network 102. The router information maintained by management software 108 may include VRF and/or RT information (associated with VRFs 114A-G and RTs 118, 120) that may also be requested or otherwise received by discover engine 110.

According to an example embodiment, management software 108 may provision (e.g., add/remove/modify) communication properties associated with one or more nodes or customer sites 116A-G of network 102. The provisioning may impact one or more of the communication pathways of network 102, which may in turn impact the configuration of VPNs 103 and classified topologies 104. Then for example, based on provisioning done by management software 108, VPN Manager 106 may update topologies 104 based on the new and/or modified connectivity among the nodes.

An event 132 may include an event generated responsive to a change, modification or alarm associated with network 102. Event 132 may indicate that connectivity between two or more customer sites 116A-G and/or VRFs 114A-G has changed or may have potentially changed. For example, a first VPN may include customer sites 116A, 116C and 116E. Then for example, customer site 116G may be added to the first VPN, which may result in event 132. Or for example, the customer sites 116A-G of VPN 103 may remain the same, but their interconnectivity (via RTs) may be modified, as indicated by event 132.

An event handler 134 may handle, receive and/or generate event 132. Event handler 134 may direct or otherwise indicate to VPN manager 106 that connectivity among one or more of the customer sites 116A-G and/or VRFs 114A-G of network 102 may have changed. Then, for example, VPN manager 106 may determine whether any of the VPNs 103 and/or topologies 104 have changed based on the modification (e.g., event 132).

It should be understood that the components of FIG. 1 are shown by way of example and that other systems may include different arrangements and/or components and fall within the scope of the system 100 of FIG. 1. For example, though not specifically shown, the system 100, in other example embodiments, may include any number of edge routers 112A,B, with varying VRFs 114A-G and RTs 118, 120 that may correspond to varying customer sites 116A-G. Furthermore, system 100 may include additional and/or different VPNs 103 of different topologies 104.

According to an example embodiment, network 102 may include a core network of wired and/or wireless connections providing connectivity between two or more nodes, as provided by one or more service providers. For example, network 102 may include a computer network provided by a service provider, wherein customer sites 116A-G connected to network 102 belong to one or more clients. Then for example, network 102 may provide communication or connectivity among two or more of the nodes of a client via VPN 103. In other example embodiments, network 102 may include multiple service providers providing connectivity to customer sites 116A-G.

System 100 may allow for identifying which sites (e.g., customer sites 116A-G) are connected to a network (e.g. 102) and the connectivity among the sites (by way of corresponding VRFs 114A-G). System 100 may allow for determining which sites may communicate with each other, and consequently which ones are part of a VPN (e.g., part of VPN 103) and classify the connectivity of the VPN into a topology (e.g., topology 104). Based on the topology, system 100 may allow for a monitoring and/or provisioning of the sites connected to the network, including each of its VPNs and may update the topology as necessary based on modifications to one or more communication pathways.

Figure 2A:
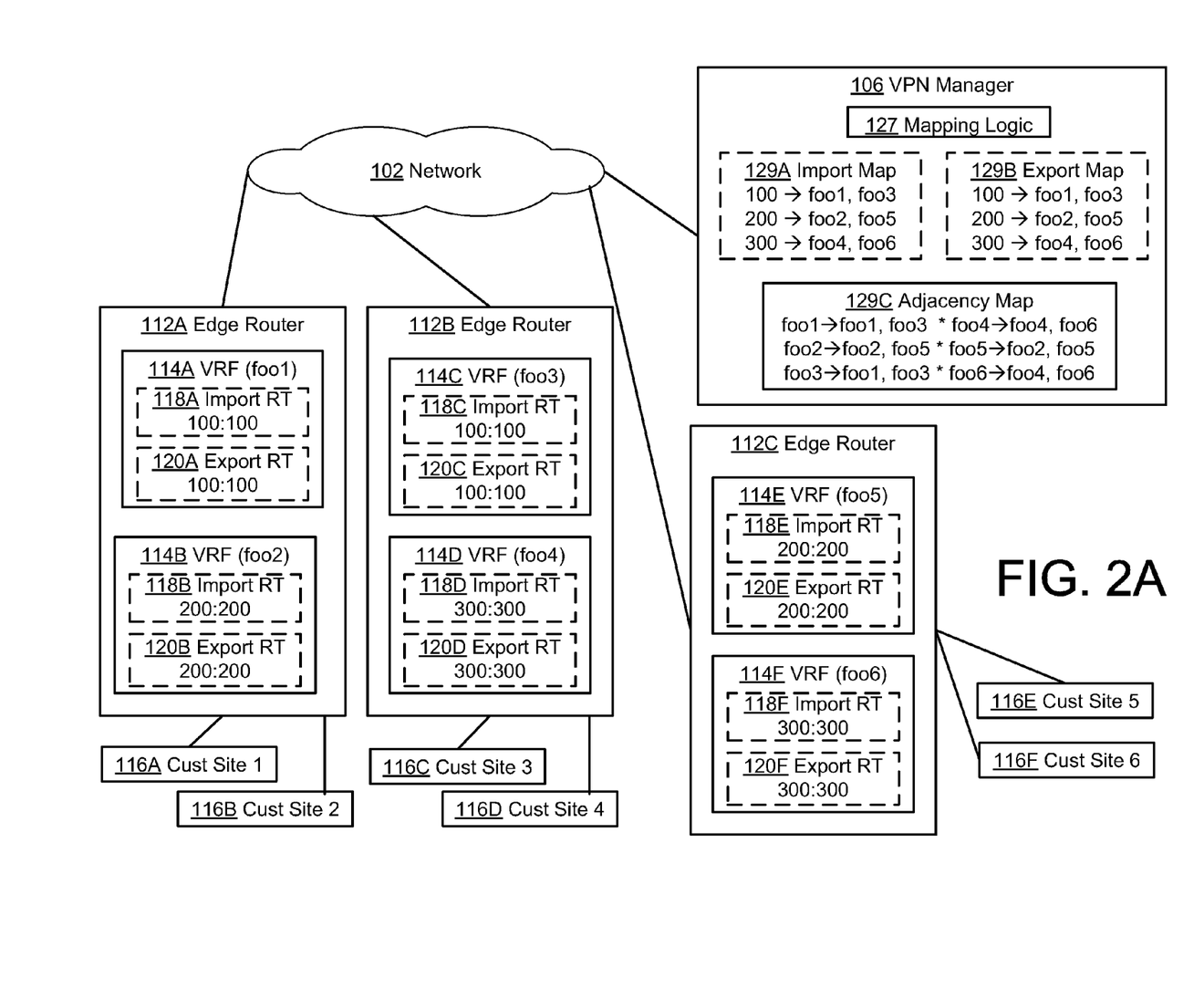
FIG. 2A is a block diagram of an example system for the identifying one or more virtual private networks (VPNs), including topologies associated therewith, of a network according to an example embodiment.

FIG. 2A is a block diagram of an example system for the identifying one or more virtual private networks (VPNs), including topologies associated therewith, of a network 102 according to an example embodiment. In the example of FIG. 2A, network 102 may include edge routers 112A, 112B and 112C. Edge Router 112A may connect customer sites 116A and 116B to network 102, whereby the remainder of edge routers 112B and 112C may connect the associated customer sites 116C-F to network 102.

Edge routers 112A-C may include one or more VRFs 114A-F that correspond to customer sites 116A-F. Each customer site 116A-F may connect to network 102 via an edge router 112A-C, wherein edge routers 112A-C may include a VRF 114A-F that corresponds to each customer site 116A-F. For example, VRF 114A (foo 1) may correspond to customer site 116A, whereby VRF 114F (foo 6) may correspond to customer site 116F. Then for example, VRFs 114A-F may include import RTs 118A-F and export RTs 120A-F corresponding to connectivity among customer sites 116A-F and/or VRFs 114A-F of network 102.

Mapping logic 127 may generate import map 129A, export map 129B and adjacency map 129C. Import map 129A may include a list of import RTs 118A-118F from network 102 and VRFs 114A-F that correspond to the list. For example, in import map 129A, RT 100 is associated with foo1 and foo3 whereby VRF 114A and 114C both include import RT 118A and 118C, respectively, of 100:100.

Export map 129B may include a list of export RTs 120A-120F from network 102 and VRFs 114A-F that correspond to the list. For example, in export map 129B, RT 300 is associated with foo4 and foo6 whereby VRF 114D and 114F both include export RT 120D and 120F, respectively, of 300:300.

Adjacency map 129C may include a mapping of intercommunication among VRFs 114A-F of network 102. According to an example embodiment, mapping logic 127 may generate adjacency map 129C based on a product and/or collaboration of import map 129A and export map 129B. For example, from import map 129A and export map 129B, mapping logic 127 may determine that foo1 and foo3 share RT 100. Then for example, in adjacency map 129C foo1 may include communication with both foo1 and foo3.

The example of FIG. 2A, is shown whereby mapping logic 127 generates maps 129A-C using all VRFs 114A-G for exemplary purposes. In other example embodiments however, an RT sorter (e.g., 122) may first group VRFs 114A-G into one or more groups based on matching or identical RTs and a representative identifier (e.g., 124) may identify a rVRF (e.g., 126) for each group. Then for example, mapping logic 127 may generate maps 129A-C using the rVRFs determined for each group.

Figure 2B:
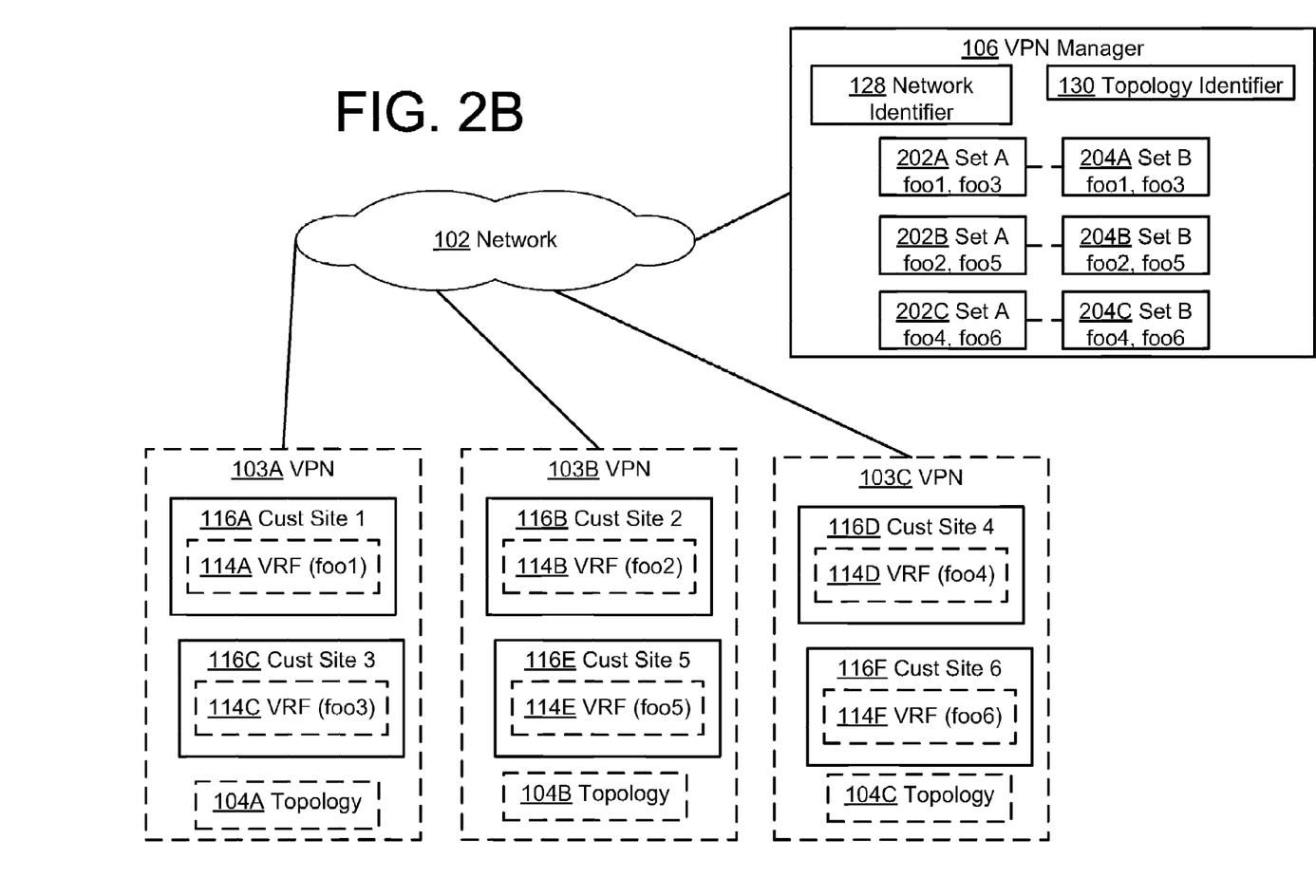
FIG. 2B is a block diagram of an example system for the identifying one or more virtual private networks (VPNs), including topologies associated therewith, of a network 102 according to an example embodiment.

FIG. 2B is a block diagram of an example system for the identifying one or more virtual private networks (VPNs), including topologies associated therewith, of a network 102 according to an example embodiment. The example system of FIG. 2B is a representation of three example VPNs, including VPNs 103A, 103B and 103C.

Network identifier 128 may determine, from adjacency map 129C (of FIG. 2A), which VRFs (e.g., 114A-F) foo1-6 belong in a VPN together (e.g., belong in one of VPNs 103A, 103B or 103C). For example, based on adjacency map 129, network identifier 128 may determine that foo4 communicates with foo4 and foo6, and that foo6 communicates with foo4 and foo6. Then for example, network identifier 128 may group foo4 and foo6 into VPN 103C. In the example of FIG. 2B, foo4 and foo6 may correspond to customer sites 4 and 6 (e.g., 116D and 116F), respectively.

Topology identifier 130 may determine topologies 104A-C for each VPN 103A-C. Topology identifier 130 may determine, for each VPN 103A-C, two groups of VRFs 114A-F, sets A 202A-C and sets B 204A-C. Sets A 202A-C may include a list of all VRFs 114A-F (or rVRFs 126, as discussed above) in a particular VPN 103A, 103b or 103C (as examples). For example, set A 202A includes foo1 and foo3, which are all of the VRFs 114A and 114C in VPN 103A. Sets B 204A-C may include a list of hub VRFs from a selected VPN 103A-C. A hub VRF may include any VRF 114A-F from a selected VPN 103A-C that can communicate with every other VRF 114A-F in the selected VPN 103A-C. For example, set B 204A includes both foo1 and foo3 because as may be determined from adjacency map 129C, both foo1 and foo3 may communicate with every other node in VPN 103A.

After dividing VRFs 114A-F into sets A 202A-C and sets B 204A-C, topology identifier 130 may determine the topologies 104A-C for each VPN 103A-C. As discussed above, topologies 104A-C may include one of full mesh, hub and spoke or partial mesh topologies. According to an example embodiment, topology identifier 130 may determine a full mesh topology wherein, for each node in a particular set A (202A-C), the number of adjacencies for that node is equal to the number of nodes in the selected set A (202A-C). Topology identifier 130 may determine a hub and spoke topology for a VPN 103A-C wherein the full mesh topology has not been determined and for each node in a particular set A (202A-C), the number of adjacencies for that node is equal to the number of nodes in the selected set A (202A-C) or the number of nodes in the corresponding set B (204A-C) for the selected VPN 103A-C. Topology identifier 130 may determine a partial mesh topology for a VPN 103A-C wherein neither the full mesh topology nor hub and spoke topology has been determined. In other example embodiments, other topologies may be used and determined by topology identifier 130.

In the example of FIG. 2B, topologies 104A-C may all be determined to be full mesh topologies. Other example embodiments however, network 102 may include different VPNs 103A-C, including for example, varying number of customer sites 116A-F belonging to each VPN 103A-C, varying connectivity among the customer sites 116A-F and/or varying topologies 104A-C for each VPN 103A-C.

Figure 2C:
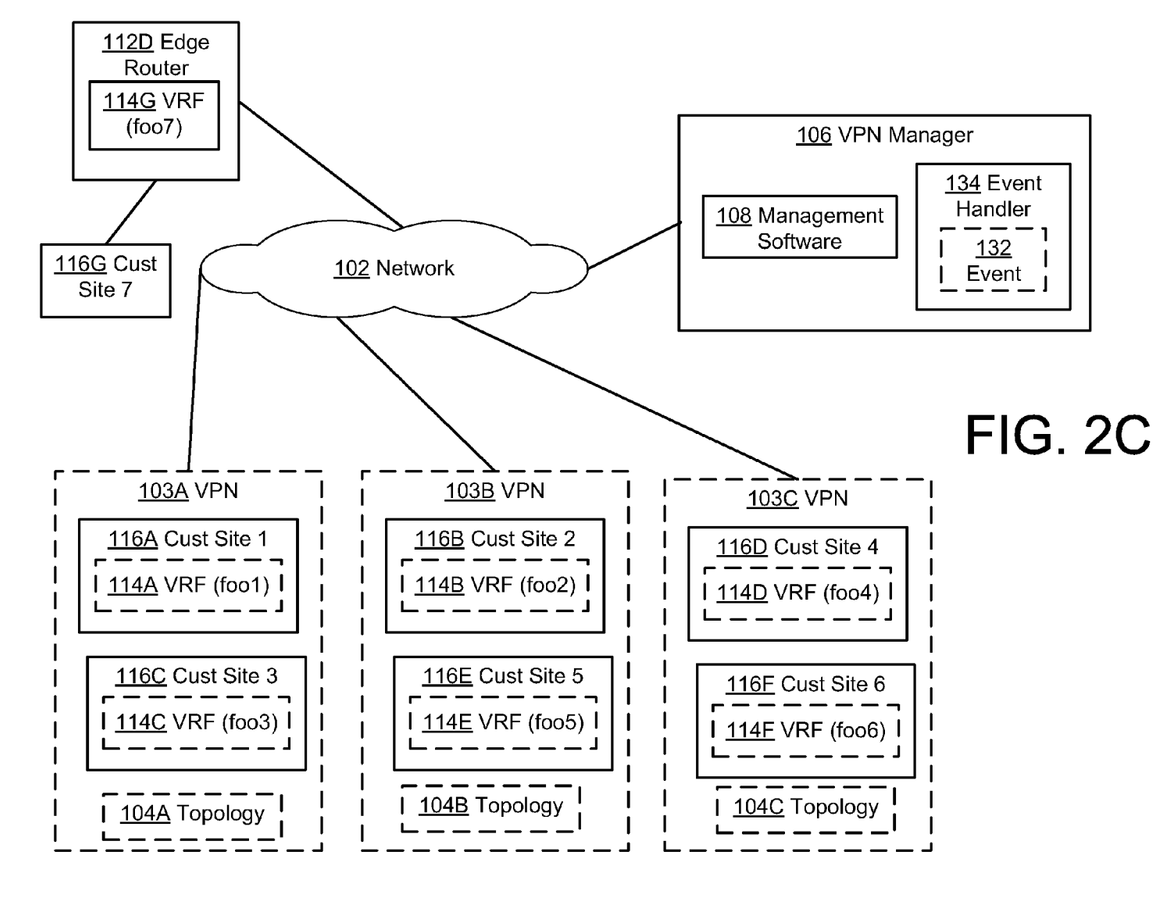
FIG. 2C is a block diagram of an example system for the identifying one or more virtual private networks (VPNs), including topologies associated therewith, of a network 102 according to an example embodiment.

FIG. 2C is a block diagram of an example system for the identifying one or more virtual private networks (VPNs), including topologies associated therewith, of a network 102 according to an example embodiment. The example system of FIG. 2C is an extension of the determined topology arrangement of FIG. 2B.

Management software 108 may add (e.g., provision) customer site 7 (e.g., 116G) to network 102. Customer site 116G may be associated with VRF 114G on edge router 112D. This provisioning of a new VRF 114G may generate event 132 to be handled by event handler 134. Event handler 134 may then determine how the modification or provisioning effects to previously determined topology arrangement of network 102.

Event handler 134 may determine for example whether the modified VRF 114G corresponds to a previously determined rVRF (e.g., 126) in which case nothing of the topology determinations 104A-C change, except that an associated VPN 103A-C now includes the modified VRF 114G (and corresponding customer site 116G). If this is the case, no further computation may be necessary to account for the modified VRF 114G.

If however no previously determined rVRF exists for the modified VRF 114G, then event handler 134 may determine whether the RTs of the modified VRF 114G correspond to any rVRF RTs. If a correspondence is found, the rVRF with the correspondence is added to a set of impacted rVRFs. Then for example, VPN manager 106, using the steps discussed above, may determine new topologies 104A-C for the set of impacted rVRFs with regard to the modified VRF 114G. This processing by event handler 134 may make topology synchronization quicker as only topologies 104A-C for those impacted VPN(s) 103A-C actually impacted by the modified VRF 114G will be recomputed.

Figure 3:
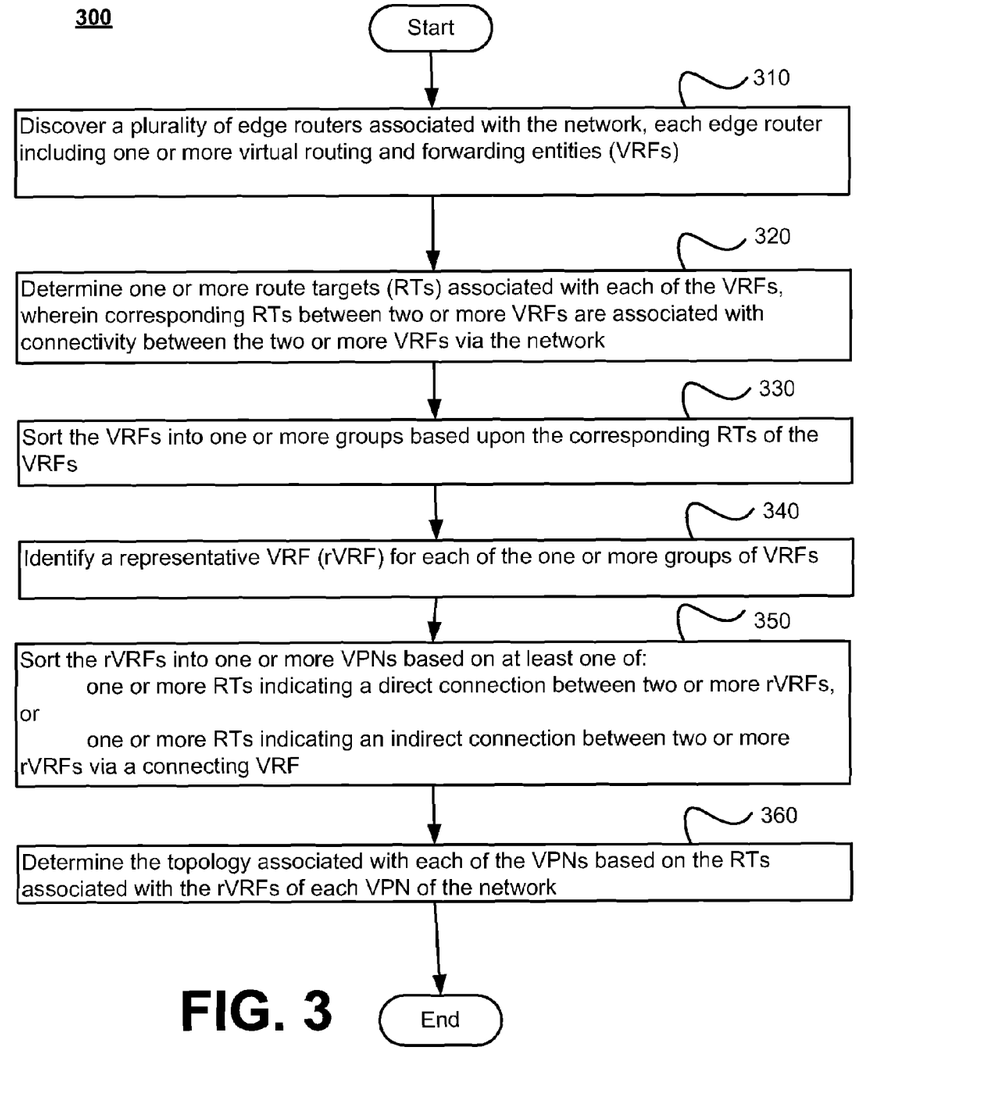
FIG. 3 is an example flow chart illustrating identification of virtual private network (VPN) topologies according to an example embodiment.

FIG. 3 is an example flow chart illustrating identification of virtual private network (VPN) topologies according to an example embodiment.

At 310, a plurality of edge routers associated with the network may be discovered, each edge router including one or more virtual routing and forwarding entities (VRFs). For example, in FIG. 1, discovery engine 110 may discover edge routers 112A and 112B associated with network 102. Then for example, edge routers 112A and 112B may be associated with VRFs 114A-C and VRFs 114D-G, respectively.

At 320, one or more route targets (RTs) associated with each of the VRFs may be determined, wherein corresponding RTs between two or more VRFs are associated with connectivity between the two or more VRFs via the network. As shown in FIG. 2A, mapping logic 127 may determine RTs (118A-F and 120A-F) for VRFs 114A-F, wherein corresponding RTs between two or more VRFs 114A-F are associated with connectivity between the two or more VRFs 114A-F. For example, import RT 118A corresponds to export RT 120C, thus indicating connectivity between VRF 114A and VRF 114C.

At 330, the VRFs may be sorted into one or more groups based upon the corresponding RTs of the VRFs. For example, in FIG. 2A, RT sorter 122 may sort VRFs 114A and 114C (foo1 and foo3, respectively) into a group based on the correspondence of the import RTs 118A and 118C and export RTs 120A and 120C.

At 340, a representative VRF (rVRF) may be identified for each of the one or more groups of VRFs. For example, in FIG. 2A, representative identifier 124 may identify a rVRF 126 for each group with corresponding RTs. In continuing the example above, in the group foo1 and foo3, representative identifier 124 may identify or select either foo1 or foo3 as rVRF 126 for the group.

At 350, the rVRFs may be sorted into one or more VPNs based on at least one of: one or more RTs indicating a direct connection between two or more rVRFs, or one or more RTs indicating an indirect connection between two or more rVRFs via a connecting VRF. For example, in FIG. 2B, network identifier 128 may sort the rVRFs 126, or VRFs 1114A-F, into VPNs 103A-C based on a direct connection or indirect connection between two or more rVRFs 126, or VRFs 114A-F, of each VPN 103A-C.

At 360, the topology associated with each of the VPNs may be determined based on the RTs associated with the rVRFs of each VPN of the network. For example, in FIG. 2B, topology identifier 130 may determine topologies 104A-C for VPNs 103A-C based on RTs 118A-F and 120A-F associated with VRFs 114A-F of each VPN 103A-C of network 102.

Figure 4:
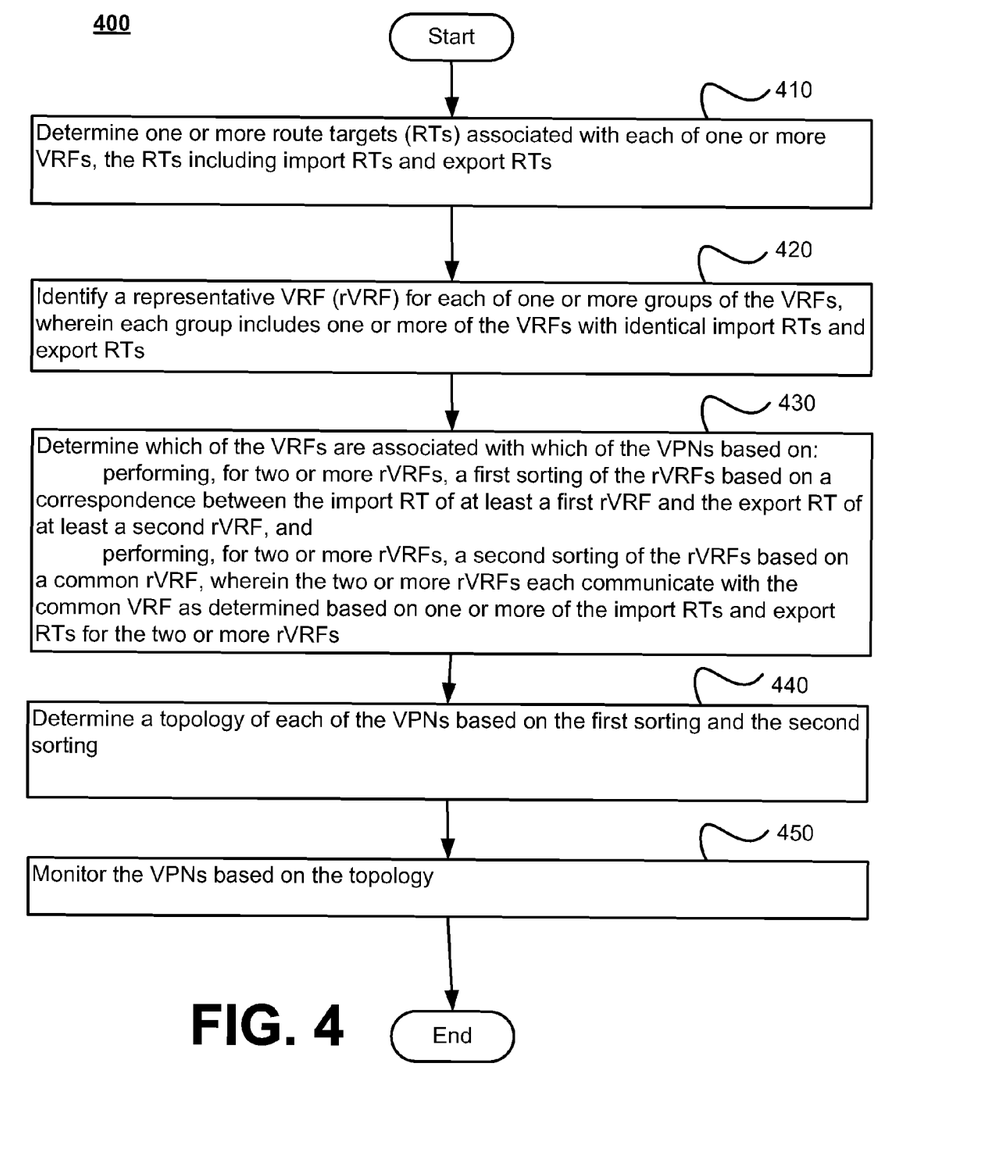
FIG. 4 is an example flow chart illustrating identification of virtual private network (VPN) topologies according to an example embodiment.

FIG. 4 is an example flow chart illustrating identification of virtual private network (VPN) topologies according to an example embodiment.

At 410, one or more route targets (RTs) associated with each of one or more VRFs may be determined, the RTs including import RTs and export RTs. For example, in FIG. 2A, discovery engine 110 may determine import RTs 118A-F and export RTs 120A-F associated with VRFs 114A-F, respectively.

At 420, a representative VRF (rVRF) may be identified for each of one or more groups of the VRFs, wherein each group includes one or more of the VRFs with identical import RTs and export RTs. For example, in FIG. 2A, RT sorter 122 may sort VRFs 114A and 114C (foo1 and foo3, respectively) into a group based on the correspondence of the import RTs 118A and 118C and export RTs 120A and 120C. Then for example, representative identifier 124 may identify a rVRF 126 for each group with corresponding RTs. In continuing the example above, in the group foo1 and foo3, representative identifier 124 may identify or select either foo1 or foo3 as rVRF 126 for the group.

At 430, which of the VRFs are associated with which of the VPNs may be determined based on: performing, for two or more rVRFs, a first sorting of the rVRFs based on a correspondence between the import RT of at least a first rVRF and the export RT of at least a second rVRF, and performing, for two or more rVRFs, a second sorting of the rVRFs based on a common rVRF, wherein the two or more rVRFs each communicate with the common VRF as determined based on one or more of the import RTs and export RTs for the two or more rVRFs. For example, in FIG. 2B, network identifier 128 may generate sets A 202A-C and sets B 204A-C showing direct and/or indirect communication between rVRFs 126 (e.g., VRFs 114A-F) of network 102.

At 440, a topology of each of the VPNs may be determined based on the first sorting and the second sorting. For example, topology identifier 130 may determine topologies 104A-C of VPNs 103A-C based on sets A 202A-C and sets B 204A-C.

At 450, the VPNs may be monitored based on the topology. For example, in FIG. 2C, management software 108 may monitor VPNs 103A-C based on topologies 104A-C, respectively.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method of determining a topology associated with each of one or more virtual private networks (VPNs) of a network comprising:
    discovering a plurality of edge routers associated with the network, each edge router including one or more virtual routing and forwarding entities (VRFs);
    determining one or more route targets (RTs) associated with each of the VRFs, wherein corresponding RTs between two or more VRFs are associated with connectivity between the two or more VRFs via the network;
    sorting the VRFs into one or more groups based upon the corresponding RTs of the VRFs;
    identifying a representative VRF (rVRF) for each of the one or more groups of VRFs;
    sorting the rVRFs into one or more VPNs based on at least one of:
        one or more RTs indicating a direct connection between two or more rVRFs, or
        one or more RTs indicating an indirect connection between two or more rVRFs via a connecting VRF; and
    determining the topology associated with each of the VPNs based on the RTs associated with the rVRFs of each VPN of the network.

2. The method of claim 1 wherein the discovering comprises discovering the plurality of edge routers including the one or more VRFs corresponding to each of one or more customer sites.

3. The method of claim 1 wherein the sorting the rVRFs into one or more VPNs based on one or more RTs indicating a direct connection between two or more rVRFs comprises sorting a first rVRF and a second rVRF into a first VPN based on an import RT of the first rVRF corresponding to an export RT of the second rVRF.

4. The method of claim 1 wherein the sorting the rVRFs into one or more VPNs based on one or more RTs indicating a direct connection between two or more rVRFs comprises sorting a first rVRF and a second rVRF into a first VPN based on an import RT of the first rVRF corresponding to an export RT of the second rVRF and an export RT of the first rVRF corresponding to an import RT of the second rVRF.

5. The method of claim 1 wherein the sorting the rVRFs into one or more VPNs based on RTs indicating an indirect connection between two or more rVRFs via a connecting VRF comprises sorting a first rVRF and a second rVRF into a first VPN based on both the first rVRF and the second rVRF having at least one of an import RT and an export RT that is associated with the connecting VRF.

6. The method of claim 1 wherein the sorting the rVRFs into one or more VPNs comprises:
   determining import RTs and export RTs for the VRFs;
   generating an import map including, for each import RT, the rVRFs associated with the import RT;
   generating an export map including, for each export RT, the rVRFs associated with the export RT;
   generating an adjacency map including, for a first rVRF of the rVRFs, the rVRFs with which the first rVRF communicates based on the import map and export map; and
   sorting the rVRFs into one or more VPNs based on the adjacency map.

7. The method of claim 1 wherein the determining the topology comprises, for each VPN:
   sorting the rVRFs associated with the VPN into a first group;
   sorting all of the rVRFs associated with the VPN that can communicate with the rVRFs of the first group, into a second group; and
   determining a topology for each VPN out of a plurality of topologies, including performing at least one of the following for each VPN:
      determining a full mesh topology wherein a first count of the rVRFs of the first group equals a second count of the rVRFs of the second group;
      determining a hub and spoke topology wherein, for each rVRF of the first group, an adjacency count equals the first count or the second count and the full mesh topology has not been determined; or
      determining a partial mesh topology wherein neither the full mesh topology nor the hub and spoke topology are determined.

8. The method of claim 1 and further comprising providing the topology to a management software configured to monitor the network.

9. The method of claim 1 and further comprising monitoring the network, including each of the one or more VPNs, based on the topology of the VPNs.

10. The method of claim 1 and further comprising monitoring the VPNs based on the topology.

11. The method of claim 1 and further comprising updating the topology based on a modified VRF, wherein the modified VRF is associated with one or more modified RTs.

12. The method of claim 11 wherein the updating comprises:
   making a first determination that the modified VRF does not correspond to one of the rVRFs;
   determining the one or more modified RTs of the modified VRF;
   determining a set of impacted rVRFs from the rVRFs wherein the set of impacted rVRFs includes rVRFs associated with the one or more modified RTs; and
   determining one or more new topologies based on the modified VRF and the impacted set of rVRFs; and
   updating the topology based on the one or more new topologies.

13. The method of claim 1 wherein the determining comprises determining the topology associated with each of the VPNs based on the RTs associated with each of the rVRFs of each VPN of the network, wherein the one or more of the VPNs are provided using multi-protocol label switching (MPLS).

14. A method of monitoring one or more virtual private networks (VPNs), each VPN including one or more virtual routing and forwarding entities (VRFs), the method comprising:
   determining one or more route targets (RTs) associated with each of the VRFs, the RTs including import RTs and export RTs;
   identifying a representative VRF (rVRF) for each of one or more groups of the VRFs, wherein each group includes one or more of the VRFs with identical import RTs and export RTs;
   determining which of the VRFs are associated with which of the VPNs based on:
      performing, for two or more rVRFs, a first sorting of the rVRFs based on a correspondence between the import RT of at least a first rVRF and the export RT of at least a second rVRF, and
      performing, for two or more rVRFs, a second sorting of the rVRFs based on a common rVRF, wherein the two or more rVRFs each communicate with the common VRF as determined based on one or more of the import RTs and export RTs for the two or more rVRFs;
   determining a topology of each of the VPNs based on the first sorting and the second sorting; and
   monitoring the VPNs based on the topology.

15. The method of claim 14 wherein the determining which of the VRFs are associated with which of the VPNs comprises:
   generating an import map for each of the import RTs, wherein the import map includes each of the rVRFs associated with each import RT;
   generating an export map for each of the import RTs, wherein the export map includes each of the rVRFs associated with each export RT; and
   generating an adjacency map based on the import map and export map, wherein the adjacency map includes which of the rVRFs communicate with one another.

16. The method of claim 15 comprising:
   performing the first sorting based on the import map and the export map; and
   performing the second sorting based on the adjacency map.

17. The method of claim 14 wherein the determining a topology comprises:
   determining a set of hub rVRFs for the VPNs, wherein a hub rVRF communicates with each of the other rVRFs in a VPN;
   performing, for each VPN:
      determining a full mesh topology for a first VPN based on a determination that each rVRF in the first VPN is included in the set of hub rVRFs;
      determining a hub and spoke topology for the first VPN based on a determination that each rVRF in the first VPN communicates with either the set of hub rVRFs in the VPN or all of the rVRFs in the VPN; and
      determining a partial mesh topology for the first VPN wherein neither the full mesh topology nor the hub and spoke topology is determined for the first VPN.

18. The method of claim 14 wherein the monitoring comprises monitoring the VPNs based on the topology associated with each of the VPNs, wherein the VPNs are all part of a network.

* * * * *